March 4, 1924.

C. A. NASH

SIGNALING SYSTEM

Filed Sept. 28, 1921

1,485,870

2 Sheets-Sheet 1

Inventor;
Charles A. Nash,
By Dyrenforth, Lee, Chritton & Wiles,
Attys.

March 4, 1924.
C. A. NASH
1,485,870
SIGNALING SYSTEM
Filed Sept. 28, 1921  2 Sheets-Sheet 2
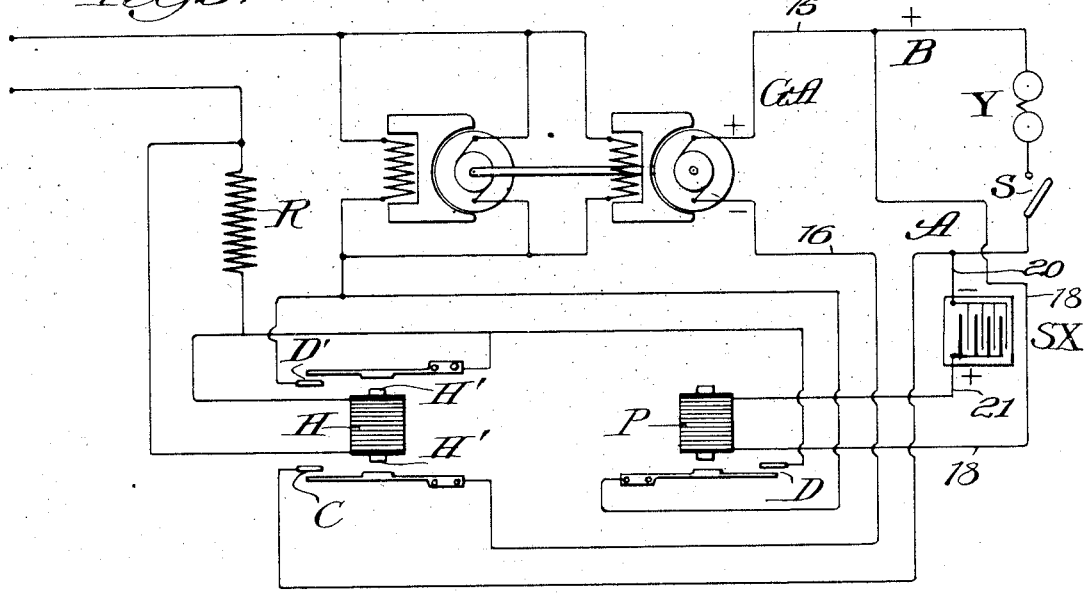
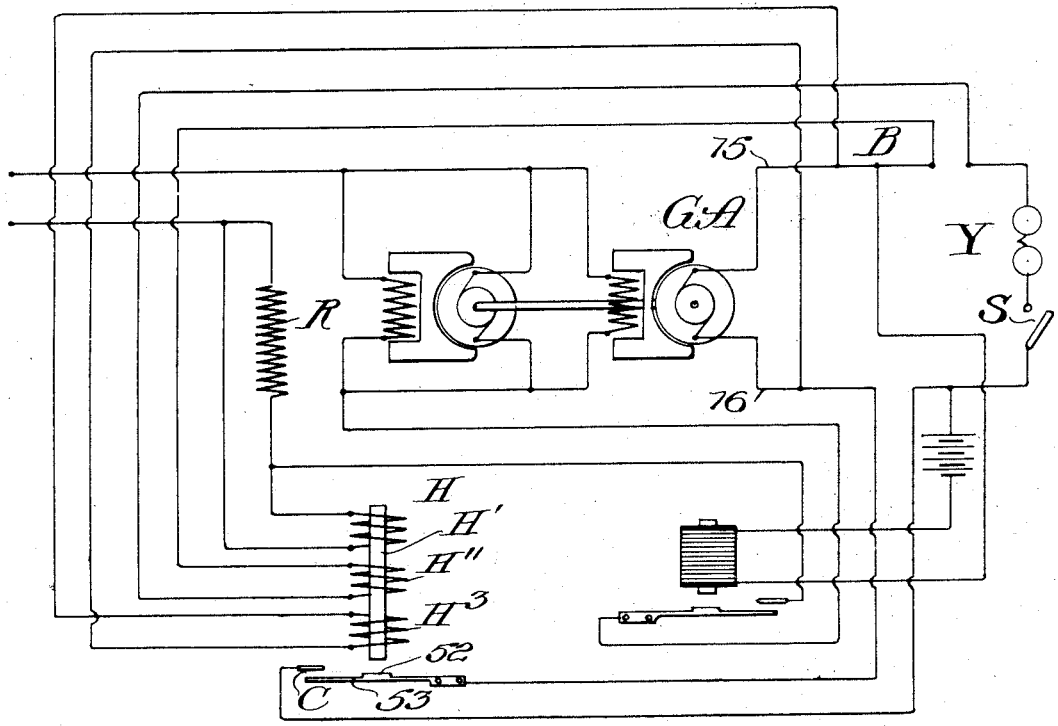
Inventor:
Charles A. Nash,
By Dyrenforth, Lee, Chritton & Wiles,
Attys.

Patented Mar. 4, 1924.

1,485,870

UNITED STATES PATENT OFFICE.

CHARLES A. NASH, OF CHICAGO, ILLINOIS, ASSIGNOR OF THREE-FOURTHS TO AMREVO ELECTRIC COMPANY, OF CHICAGO, ILLINOIS, A CORPORATION OF ILLINOIS, AND ONE-FOURTH TO SEYMOUR STEDMAN, OF CHICAGO, ILLINOIS.

SIGNALING SYSTEM.

Application filed September 28, 1921. Serial No. 503,803.

*To all whom it may concern:*

Be it known that I, CHARLES A. NASH, a citizen of the United States, residing at 2309 Archer Avenue, Chicago, in the county of Cook and State of Illinois, have invented a new and useful Improvement in Signaling Systems, of which the following is a specification.

My invention relates to improvements in signaling systems, and more especially to a direct current signaling system. My object is to provide means by which a relatively high voltage direct current service line may be made to energize a relatively low voltage signaling circuit.

Figure 1:
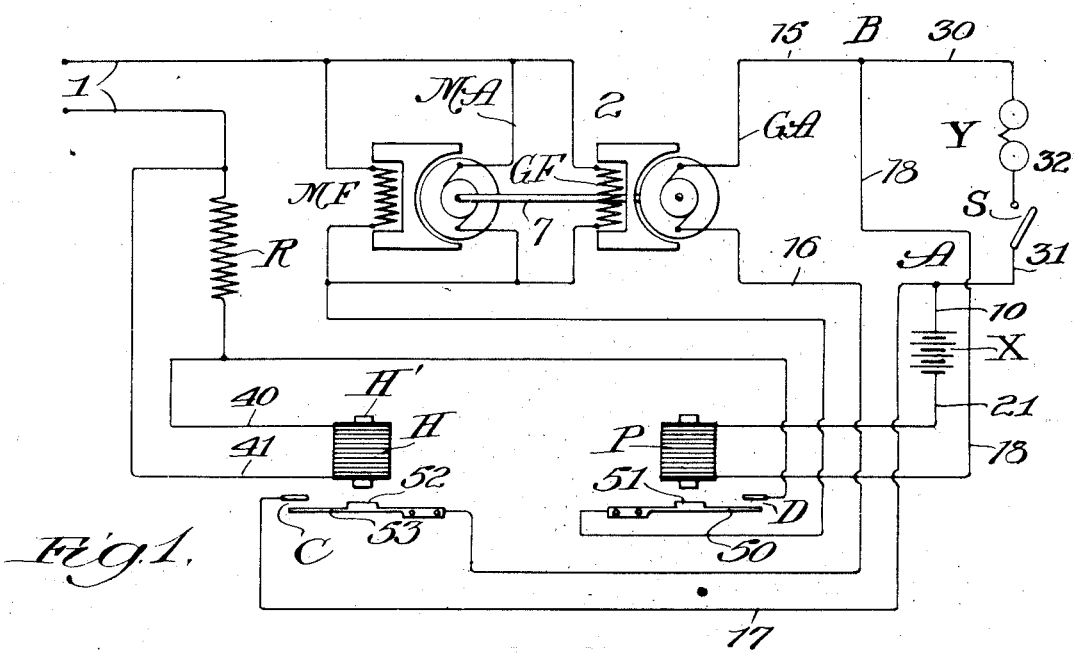
Figure 2:
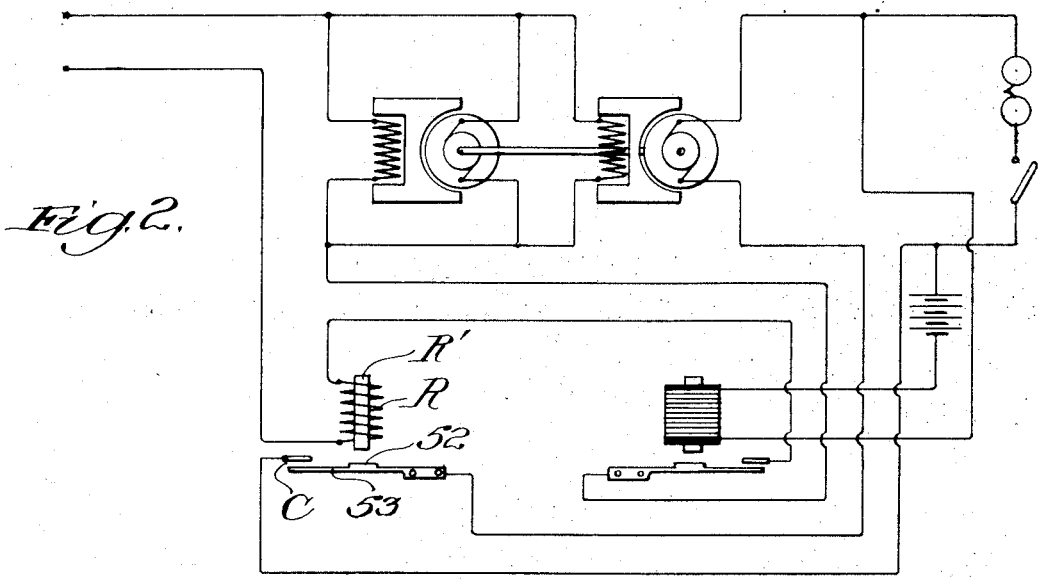

The invention will be fully understood from the following specification taken in connection with the accompanying drawings in which Figure 1 is a diagrammatic view of a signaling system designed in accordance with the invention, Figure 2 is a similar view showing a modified form of the device, Figure 3 is a similar view showing another modification, and Figure 4 is a similar view showing still another modification.

Referring to the drawings, the numeral 1 designates a relatively high voltage direct current circuit, as for example, an 110 volt city service line. 2 indicates in general a motor generator set, comprising a direct current motor adapted to be operated by current from the direct current service circuit, which is directly connected to a bell-ringing generator of relatively low voltage. The motor generator set is shown diagrammatically, MF indicating the motor field winding, MA the motor armature circuit, GF the generator field circuit and GA the generator armature circuit. The generator and motor are indicated diagrammatically as being directly connected by a diagrammatic representation of a shaft 7. In series with the relatively high voltage direct current circuit 1, is a resistance coil R and a contact switch D. The motor field winding MF, the motor armature winding MA, and the generator field winding GF are also each in series with the circuit, but not in series with each other.

The wire 15 leads from one side of the generator armature winding GA, to the terminal B. The wire 16 leads from the other side of this winding to the switch C, from which the wire 17 leads to the terminal A. From the terminal B a wire 18 leads to the magnetic coil P and from the terminal A a wire 10 leads to the primary battery X, from which a wire 21 leads to the other side of the magnetic coil P. A wire 30 leads from the terminal B to a signaling device, such as for example, a bell Y, and a wire 31 leads from the terminal A to a control switch, such as for example, a push button S. The bell Y and control switch S are connected by a wire 32. The two ends of the resistance coil R are connected by the wires 40 and 41 to the magnetic coil H.

The switch D is located adjacent the coil P and is adapted to be closed by the energizing of this coil P. This closing may be accomplished in any desired manner. I have here indicated at one side of the switch D, a springing arm 50 provided with an armature 51 adapted to be drawn toward the coil P to close the contact D. The arm 50 is spring mounted so that it automatically will open, when current ceases to flow through the coil P, or when the flow falls below a certain rate. In the same manner, the switch C is closed by the coil H, which attracts the armature 52 on the arm 53. This switch likewise automatically opens when the flow of current through H falls below a certain given rate, or stops entirely.

The operation of the device is as follows. Closing of the switch S completes a circuit from the battery X, through the wire 21, coil P, wire 18, and bell Y. Energizing of the coil P operates to close the switch D, which completes a circuit from the service line through the motor field, motor armature, and generator field. Since at the instant of closing the switch S, the motor generator set is stationary, its inertia puts a heavy load on the service circuit. This heavy load caused by the starting of the motor generator set, causes a rush of current through the resistance coil R which is in series with the service circuit. This rush of current, or relatively great flow of current through the resistance coil R, causes a voltage drop across its terminals, causing current to flow through the wires 40 and 41, and the magnetic coil H. This flow of current through the coil H energizes the same and closes the switch C. Closing of the switch C puts the bell Y in circuit with the generator armature winding, thus causing the bell Y to operate. As long as S remains closed, the generator and motor remain loaded, and the voltage drop across the ends of the resistance coil R remains sufficient to keep the coil H energized to hold the switch C closed. When the switch S is opened, the load is removed from the motor generator, since the circuit through the generator armature winding is broken. This causes a decrease of flow through the resistance coil R, thus removing to a large extent the voltage drop across its terminals. This results in decreasing the flow of current through the coil H sufficiently so that the switch C opens. The opening of the switch C breaks the flow of current through the coil P, causing the contact D to open, thereby stopping the motor generator. It will be seen, therefore, that the motor generator set is in operation only while the switch S is closed. The poles of the battery X are so arranged that when the motor generator is operating, the current delivered by the generator will not neutralize the current flowing from the battery. If it did so neutralize the battery, the current through the coil P would be cut off with the result that the switch D would open, thus stopping the device. If desired, however, the generator could be so designed that the current flow through the coil P will be sufficient, when the device is operating, to keep the contact D closed.

In Fig. 2 I have shown a modified form of the device, in which the coil H, is omitted and the resistance coil R is placed in the same position as that occupied by the coil H, in the preferred form. In this modified form, the coil R is also provided with a core R', which when magnetized by flow of current through the coil R, closes the switch C in the same manner as flow of current through the coil H, in the preferred form, closes the switch C. The spring tension of the arm 53 is sufficient so that the switch D will remain open except when, under loaded conditions, the flow of current through R is sufficient to close it. The only difference between this modified form and the preferred form is that in this modification the coil H is dispensed with, and the coil R with its core R' performs the same function as the coil H in the preferred form. Under loaded conditions, there is sufficient current flowing through the coil R to close the switch C. When the load is removed, this current decreases sufficiently to permit the switch C to open.

In Fig. 3, I have shown another modified form which is similar to the preferred form, except that a switch D' in parallel with the switch D, is provided. In this modification, the switch D' is located close to the coil H and is adapted to be closed by current flowing through the coil H, in the same manner as the switch C is closed. In this modification, instead of the primary battery X, there is provided a storage battery SX. The object of this arrangement is to permit the charging of the storage battery at each operation, thus maintaining the battery fully charged. In this form of device, the relatively low voltage generator is designed to give a direct current, and the positive side of the generator armature winding, indicated by the plus sign, is connected to the wire 15 leading to the terminal B. The negative side is connected to the wire 16, leading through the switch C to the terminal A. This makes the terminal A negative and the terminal B positive, when the motor generator is operating. The negative side of the storage battery SX is connected by the wire 20 to the terminal A and the positive side by the wire 21 to the coil P, leading through the wire 18 to the positive terminal B. With this construction, as soon as the motor generator starts, the current delivered by the generator will tend to charge the storage battery SX by sending through a reverse flow. This charging current will, of course, neutralize the effect of the battery to such an extent that flow of current will practically stop through the coil P. The result of this will be that the switch D will open. Such opening of the switch would stop operation of the device. For this reason the switch D' is provided which is closed by flow of current through the coil H.

In Fig. 4, I have shown another modified form. This form is similar to the preferred form, except that the core H' of the coil H is provided with two additional coils H'' and H³. The coil H'' is connected in series between the terminal B and the bell Y. The coil H³ has one of its ends connected to the wire 15 leading to one side of the generator armature, and its other end connected to the wire 16 leading to the other side of the generator armature. H'' is so wound on the coil H' that its effect will be cumulative with the coil H. The coil H³ is wound in an opposite direction in order to oppose the coils H and H''. This modification is designed generally for devices where the load on the generator does not produce a sufficient variation in the motor line current to properly operate the coil H which operates the contact C. The same modification could likewise be applied to the modification shown in Fig. 2. That is, the coils H'' and H³ could be wound on the core R' in order to increase the effectiveness of the same. It is obvious also, that the coil H³ could be dispensed with and merely the coils H and H'' used alone. With the three coils as shown in Fig. 4, the operation is as follows. At the start, when the load is greatest, the coil H will operate to draw the armature 52 toward it to close the contact C. At the very start, no current will be flowing through the coils H'' and H³, but this starting will give the greatest load and will cause sufficient flow through the coil H to close the contact C. As the motor generator commences to move and gains its speed, the flow through the coil H will decrease, but at the same time the generator will commence to give current through the bell-ringing circuit and consequently current will be supplied to the coil H''. This coil H'' is wound in order to give a cumulative effect with the coil H. This cumulative effect of the coil H'' with the coil H is sufficient to hold the contact C closed, even with the weakened current in the coil H. The coil H³ is wound to oppose coils H and H''; but when the device is operating and the load is on the generator, the voltage is so low that opposition of coil H³ is not sufficient to counteract the coils H and H'' to such an extent as to cause release of contact C. As a result of this, contact C is held closed all the time that the load is on the device. As soon as the push-button switch S is opened, and the load removed from the generator, the voltage rises with the result that there is greater flow of current through the coil H³ which increases the opposing force of this coil. The coils are so wound that this opposition of coil H³ with the load removed, is sufficient to just about counteract or neutralize the coils H and H'', so that the contact C will open.

While I have shown and described certain embodiments of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

Although I have shown a system for energizing a relatively low voltage signaling circuit, it is obvious that any other kind of circuit requiring a relatively low voltage may be energized by my system from a high voltage direct current. I have shown a signaling circuit merely for the purpose of illustrating my invention. Likewise, although I have shown in the signaling circuit a bell to illustrate one form of signaling device, it is obvious that any other kind of signaling device could be used, or in fact, any kind of low voltage translating device. In other words, my invention comprehends the operation of any kind of low voltage translating device from a high voltage direct current. It is also to be noted that in my improved system such energizing of a low voltage translating device from a high voltage direct current is accomplished by means of a system in which the high voltage direct current circuit is entirely open when the system is not in use.

What I claim as new and desire to secure by Letters Patent, is:

1. In a system of the class described; a motor generator set; a source of relatively high potential direct current connected to a circuit having in series therein the motor of the motor generator set, and a switch (D); a low voltage circuit connected to the generator of the motor generator set, and having in series therein a control switch, a low voltage translating device, and a switch (C); an auxiliary low voltage shunt circuit, including therein a source of potential and the control switch; means operated by flow of current through the auxiliary low voltage shunt circuit for closing the switch (D); and means operated by flow of the relatively high potential direct current for closing the switch (C).

2. In a system of the class described; a motor generator set; a source of relatively high potential direct current circuit adapted to furnish current to the motor generator set; a low voltage circuit connected to the generator of the motor generator set, and having in series therein a low voltage translating device; an auxiliary low voltage shunt circuit including a source of potential and a control switch; means operated by flow of current through the auxiliary low voltage shunt circuit for permitting flow of current from the source of relatively high potential direct current to the motor generator; and means operated by flow of the relatively high potential direct current for permitting flow of current from the generator to the low voltage translating device.

3. In a system of the class described; a motor generator set; a source of relatively high potential direct current connected to a circuit having in series therein the motor of the motor generator set and a switch (D); a low voltage circuit connected to the generator and having in series therein a low voltage translating device and a switch (C); an auxiliary low voltage shunt circuit including a source of potential and a control switch; means operated by flow of current through the auxiliary low voltage shunt circuit for closing the switch (D); and means operated by flow of the relatively high potential direct current for closing the switch (C).

4. In a system of the class described; a motor generator set; a source of relatively high potential direct current connected to a circuit having in series therein the motor of the motor generator set, a switch (D), and a resistance coil (R); a low voltage circuit having in series therein the generator, a low voltage translating device, and a switch (C); an auxiliary low voltage shunt circuit including therein a source of potential and a control switch; means operated by flow of current through the auxiliary low voltage shunt circuit for closing the switch (D); and means operated by flow of the relatively high potential direct current for closing the switch (C), said means comprising a magnetic coil attached to the ends of the resistance coil (R).

5. In a system of the class described; a motor generator set: a source of relatively high potential direct current connected to a circuit having in series therein the motor of the motor generator set, a switch (D), and a resistance coil (R); a low voltage circuit having in series therein the generator, a low voltage translating device, and a switch (C); an auxiliary low voltage shunt circuit including a source of potential and a control switch; means operated by flow of the relatively high potential direct current for closing the switch (C), said means comprising a magnetic coil attached to the ends of the resistance coil (R), which magnetic coil is adapted to be energized by flow of current through the resistance coil (R) under loaded conditions.

In witness whereof I have hereunto set my hand and seal this second day of August, 1921.

CHARLES A. NASH. [L. S.]